United States Patent [19]

Westerman

[11] Patent Number: 4,722,872

[45] Date of Patent: Feb. 2, 1988

[54] CLAD MAGNETIC MEMORY DISK SUBSTRATE

[75] Inventor: Edwin J. Westerman, San Ramon, Calif.

[73] Assignee: Kaiser Aluminum & Chemical Corporation, Oakland, Calif.

[21] Appl. No.: 856,244

[22] Filed: Apr. 28, 1986

[51] Int. Cl.$^4$ .................. B32B 15/20; C22F 1/04
[52] U.S. Cl. .................. 428/654; 148/11.5 A; 148/11.5 Q; 148/440
[58] Field of Search .................. 428/654, 928; 148/11.5 A, 11.5 Q, 439, 440

[56] References Cited

U.S. PATENT DOCUMENTS

| | | | |
|---|---|---|---|
| 3,418,090 | 12/1968 | Fritzlen | 428/654 |
| 3,471,272 | 10/1969 | Wilhelm et al. | 428/654 |
| 3,595,631 | 7/1971 | Broverman | 428/654 |
| 3,881,883 | 5/1975 | Fritzlen | 428/654 |
| 4,430,387 | 2/1984 | Nakagawa et al. | 428/654 |

FOREIGN PATENT DOCUMENTS 49806  4/1977  Japan .................. 428/611

*Primary Examiner*—John J. Zimmerman
*Attorney, Agent, or Firm*—Andrew E. Barlay

[57] ABSTRACT

A magnetic memory disk substrate which maintains a high degree of surface smoothness together with high yield strength is prepared by cladding a core material with a cladding layer containing a maximum of about 3% magnesium. The core material is aluminum alloyed with one or more elements such as zinc, magnesium, copper and silicon to produce an improved yield strength. The cladding comprises from about 3% to about 10% per side of the thickness of the entire composite and generally contains further alloying elements for enhanced corrosion resistance. Silicon impurities generally amount to less than 0.5%.

14 Claims, No Drawings

CLAD MAGNETIC MEMORY DISK SUBSTRATE

BACKGROUND OF THE INVENTION

This invention relates to aluminum substrates for rigid magnetic memory disks.

Aluminum alloys have been extensively used in the manufacture of rigid computer memory disks due to their high strength, light weight, low cost and good surface finishing characteristics. The aluminum alloys are used as substrates for the magnetizable layers, and are given a high yield strength by the inclusion of magnesium as an alloying component, high yield strength being one of the essential characteristics of a successful high quality memory disk.

Advances in memory storage technology such as a reduction of the thickness of the magnetizable layer and an increase in the density of information stored in it have brought changes in the requirements for disk substrates. In particular, the smoothness of the substrate has become more critical while the requirement of high yield strength still remains.

Coated and layered substrates have been disclosed in a number of U.S. patents. Peters et al., U.S. Pat. No. 3,466,156 (Sept. 9, 1969) disclose a substrate coated first with a zinc layer followed by a nonmagnetic nickel layer. Yanagisawa et al., U.S. Pat. No. 4,069,360 (Jan. 17, 1978) disclose a memory disk with an nonmagnetic nickel-phosphorus alloy layer interposed between the substrate and the magnetic layer. Nakagawa et al., U.S. Pat. No. 4,430,387 (Feb. 7, 1984) disclose the application to a substrate of a thin metal film which is readily anodized.

SUMMARY OF THE INVENTION

The present invention resides in a magnetic disk substrate which combines a core material comprising aluminum alloyed with one or more elements to produce an improved yield strength, clad with an aluminum-base alloy containing a maximum of about 3% magnesium. While sufficient strengthening characteristics are retained, the low magnesium content of the cladding layer lessens the tendency of the alloy to form magnesium silicide particles which are detrimental to the smoothness of the substrate surface.

DETAILED DESCRIPTION OF THE INVENTION AND PREFERRED EMBODIMENTS

The introduction of a cladding layer in the present invention is accompanied by a relaxation of some of the prevailing requirements for the remainder (i.e., core) of the substrate, notably the need to minimize precipitate formation, impurities and corrosion tendencies. The core material is open to an expanded array of possibilities, since its function is now primarily limited to supplying yield strength to the substrate, rather than controlling surface properties as well. Thus, the core may be any aluminum-base alloy, where the alloying element and its amount are selected to provide a yield strength of at least about 8 ksi. This will include, for example, alloys strengthened by copper, magnesium, magnesium combined with silicon, zinc combined with magnesium, and zinc combined with both magnesium and copper. Classes from which these alloys may be selected are the 2XXX, 5XXX, 6XXX and 7XXX series as designated by the Aluminum Association. Examples of alloys within these classes which are suitable for use are 2014, 2024, 5052, 5086, 6061 and 7075. Alloys having a yield strength of at least about 14 ksi are preferred. Particularly preferred alloys are those containing at least about 3.5% magnesium, with 3.5% to 5% magnesium most preferred.

The cladding layer, on the other hand, comprises an aluminum-base alloy containing a maximum of about 3% magnesium, preferably from about 1.0% to about 2.0%. The silicon impurity level in the cladding alloy will generally comprise less than about 0.5%, and preferably from about 0.01% to about 0.2% silicon. Any zinc present will generally comprise less than about 0.5%.

Other alloying elements may be included for purposes of enhancing the properties of the product. Manganese, for example, is known to improve corrosion resistance by absorbing iron impurity into intermetallic compounds. Accordingly, manganese may be included, typically at a level between about 0.2% and about 0.7%. Likewise, chromium may be included for additional corrosion resistance in view of its ability to retard the selective precipitation of $Mg_2Al_3$ and to control grain size by inhibiting recrystallization and slowing grain growth. Typical chromium levels will range from about 0.05% to about 0.25%. For most of the disk, corrosion resistance is primarily a concern in the cladding since this is the outermost layer. The core is exposed at the rim of the disk, however, raising the possibility of core corrosion as well. Thus, the corrosion retarding elements may be included in either or both of the core and cladding layers.

The thickness of the cladding layer is not critical and may vary widely. A primary consideration is the degree to which the cladding will be removed in subsequent processing operations prior to application of the magnetizable layer. Such operations may include machining and polishing. In addition, the cladding must be thick enough to mask any irregularities (such as magnesium silicide constituents) in the core which might affect the surface smoothness, yet thin enough so that the yield strength characteristics of the core may be imparted to the entire composite. This will vary to some degree with the magnesium levels in both core and cladding. In general, however, best results will be obtained with a cladding layer (prior to machining and polishing) comprising from about 3% to about 10% of the thickness of the substrate, preferably from about 6% to about 8%. Since magnetizable layers are generally applied to both sides of the substrate, the cladding of the present invention will be applied to both sides of the core. The thickness percentages cited above accordingly represent the thickness per side based on the total substrate. Single side cladding, however, is also within the scope of the invention, although less preferred.

Prior to its application to the core, the cladding material is homogenized to dissolve magnesium silicide constituents which are formed during casting. The low magnesium level in the cladding material permits homogenization to occur at relatively low temperatures, depending on the levels of both magnesium and silicon. The following is a list of homogenization temperatures for such alloys, taken from *Equilibrium Diagrams of Aluminium Alloy Systems*, Publication No. 25 of the Aluminium Development Association (London), page 100, FIG. 76 (December, 1961):

| Homogenization Temperatures For Al—Mg—Si Ternary Alloys | | |
|---|---|---|
| % Mg | % Si | Temperature Required to Dissolve Mg$_2$Si |
| 3.0 | 0.10 | 1020° F. |
| 3.0 | 0.05 | 840° F. |
| 2.0 | 0.10 | 930° F. |
| 2.0 | 0.05 | 770° F. |
| 1.5 | 0.10 | 880° F. |
| 1.5 | 0.05 | 740° F. |
| 1.0 | 0.10 | 840° F. |
| 1.0 | 0.05 | 700° F. |

These figures are derived from a graph and are thus approximations. The silicon amounts listed are within the range in which silicon normally appears as an impurity in aluminum. The time required for homogenization will generally range from about 8 to about 30 hours. As a general rule, less time is needed at higher temperatures.

The cladding may be applied to the core by conventional techniques. Hot rolling is a notable example. As an optional variation, a virtually magnesium-free intermediate layer may be interposed between the core and cladding layer to facilitate roll bonding. By "magnesium-free" is meant less than about 0.2% magnesium, preferably less than about 0.05% magnesium.

The rolling process may be used as a means to control the ultimate grain size of the substrate following the subsequent processing steps in the preparation of the ultimate product. Grain size control may be beneficial to both core and cladding—the core for reasons of strength, and the cladding for reasons of the ease of surface finishing. In particular, a selected amount of residual cold work, particularly from about 20% to about 50%, is desirable. Control of the residual cold work may be achieved by a full anneal before the final cold rolling reduction.

Further processing steps in accordance with conventional rigid memory disk manufacture will generally be followed prior to application of the magnetizable layer. One such step is thermal flattening, which is a heat treatment designed to reduce or preferably eliminate residual stresses in the substrate which might be detrimental to its flatness. This treatment is done in the annealing temperature range, which is generally from about 500° F. (260° C.) to about 700° F. (371° C.), preferably from about 550° F. (288° C.) to about 650° F. (343° C.). This is typically done with a number of disks stacked together and a compressive pressure applied to the stack by weights or springs, in a manner well known to those skilled in the art. Yield strength is provided by magnesium, copper or other yield strength enhancing alloying elements in solid solution and by any age-hardening constituents present. A tensile yield strength of at least about 8 ksi, preferably at least about 14 ksi, is desirable for the composite overall.

The foregoing is intended primarily for purposes of illustration. It will be readily apparent to those skilled in the art that numerous modifications and variations of the procedures and conditions described above may be made without departing from the spirit and scope of the invention.

What is claimed is:

1. A rigid magnetic memory disk substrate comprising:
a core comprising an aluminum-base alloy containing from about 3.5% to about 5% magnesium, from about 0.2% to about 0.7% manganese, and from about 0.5% to about 0.25% chromium; and a cladding layer comprising a homogenized aluminum-base alloy containing from about 1.0% to about 2.0% magnesium, from about 0.01% to about 0.2% silicon, from about 0.2% to about 0.7% manganese and from about 0.05% to about 0.25% chromium, said cladding layer comprising from about 6% to about 8% of the thickness of said substrate.

2. A rigid magnetic memory disk substrate comprising:
   (a) a core comprising an aluminum-base alloy containing at least about 3.5% magnesium;
   (b) a cladding layer comprising an aluminum-base alloy that has been previously homogenized and containing from about 1.0% to 2.0% magnesium and from about 0.01% to less than about 0.5% silicon; and
   (c) at least one of the aluminum-base alloys further containing from about 0.2% to about 0.7% manganese.

3. A rigid magnetic memory disk substrate according to claim 2 wherein the cladding layer contains from about 0.01% to about 0.2% silicon.

4. A rigid magnetic memory disk substrate according to claim 2 wherein the aluminum-base alloy core has a yield strength of at least about 14 ksi.

5. A rigid magnetic memory disk substrate according to claim 2 wherein the thickness of the cladding layer per side of the substrate is from about 3% to about 10% of the thickness of the substrate.

6. A rigid magnetic memory disk substrate according to claim 2 wherein both aluminum-base alloys contain from about 20% to about 50% cold work.

7. A rigid magnetic memory disk substrate according to claim 2 wherein at least one of the aluminum-base alloys further contains from about 0.05% to about 0.25% chromium.

8. A rigid magnetic memory disk substrate according to claim 2 wherein the cladding layer contains less than about 0.5% zinc.

9. A method for preparing a rigid memory disk substrate comprising the steps of:
   (a) selecting an aluminum-base alloy core material having a yield strength of at least about 8 ksi and containing at least about 3.5% magnesium;
   (b) selecting and homogenizing a cladding material from an aluminum-base alloy containing from about 1.0% to 3.0% magnesium and from about 0.01% to less than about 0.5% silicon;
   (c) applying a cladding material to at least one side of the core material; and
   (d) thereafter rolling and cutting the formed composite into a disk substrate suitable for receiving a magnetizable layer.

10. A method according to claim 9 wherein in step (b) the aluminum-base alloy contains from about 0.01% to about 0.2% silicon.

11. A method according to claim 9 wherein the cladding material applied in step (c) contains from about 0.05% to about 0.25% chromium.

12. A method according to claim 9, wherein at least one of the aluminum-base core and aluminum-base cladding material contains from about 0.2% to 0.7% manganese.

13. A method according to claim 9 wherein from about 20% to about 50% cold work is left in the disk substrate of step (d).

14. A method according to claim 9 wherein the disk substrate made in step (d) is heated to reduce stresses introduced in step (d).

* * * * *